United States Patent Office 3,487,503
Patented Jan. 6, 1970

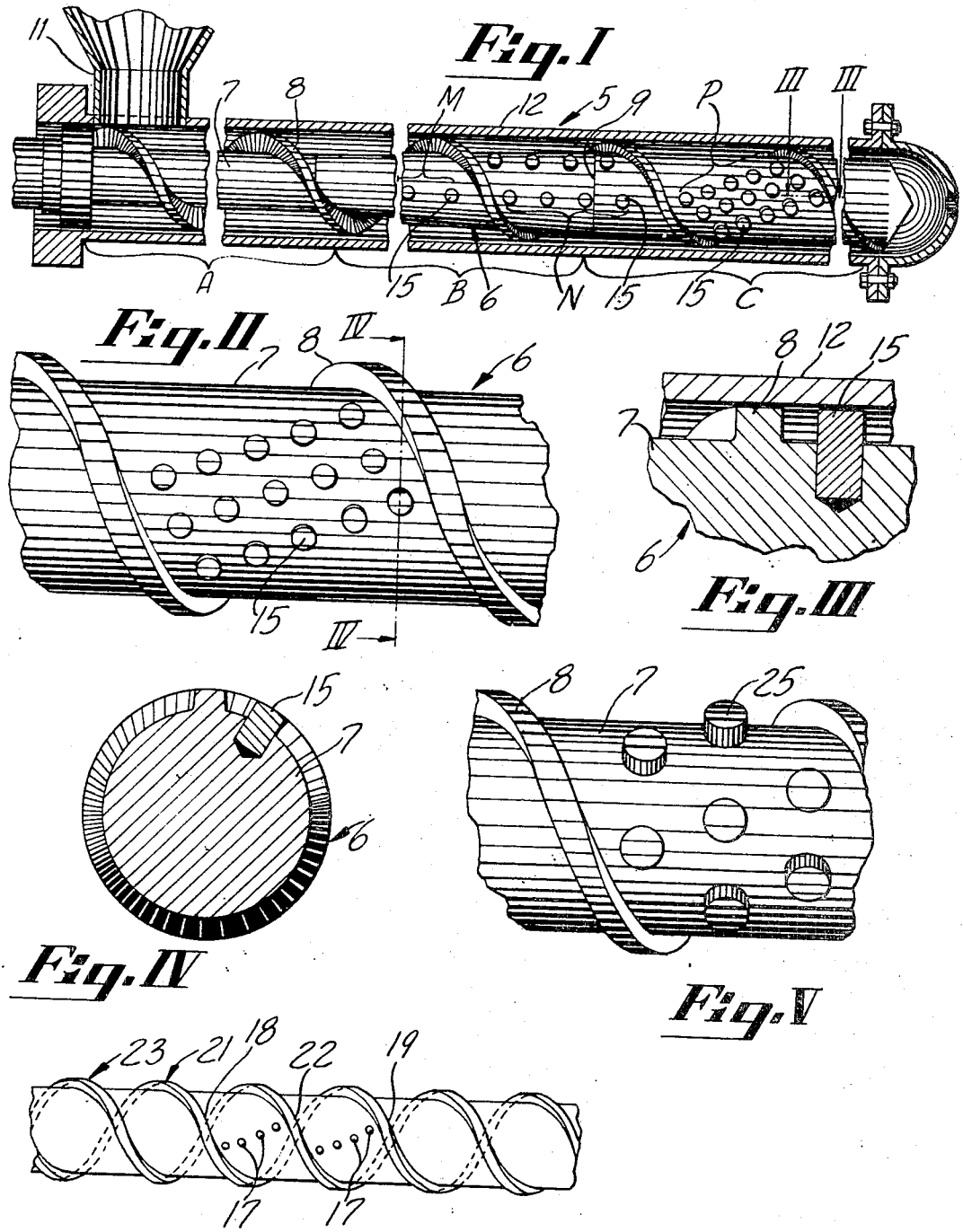

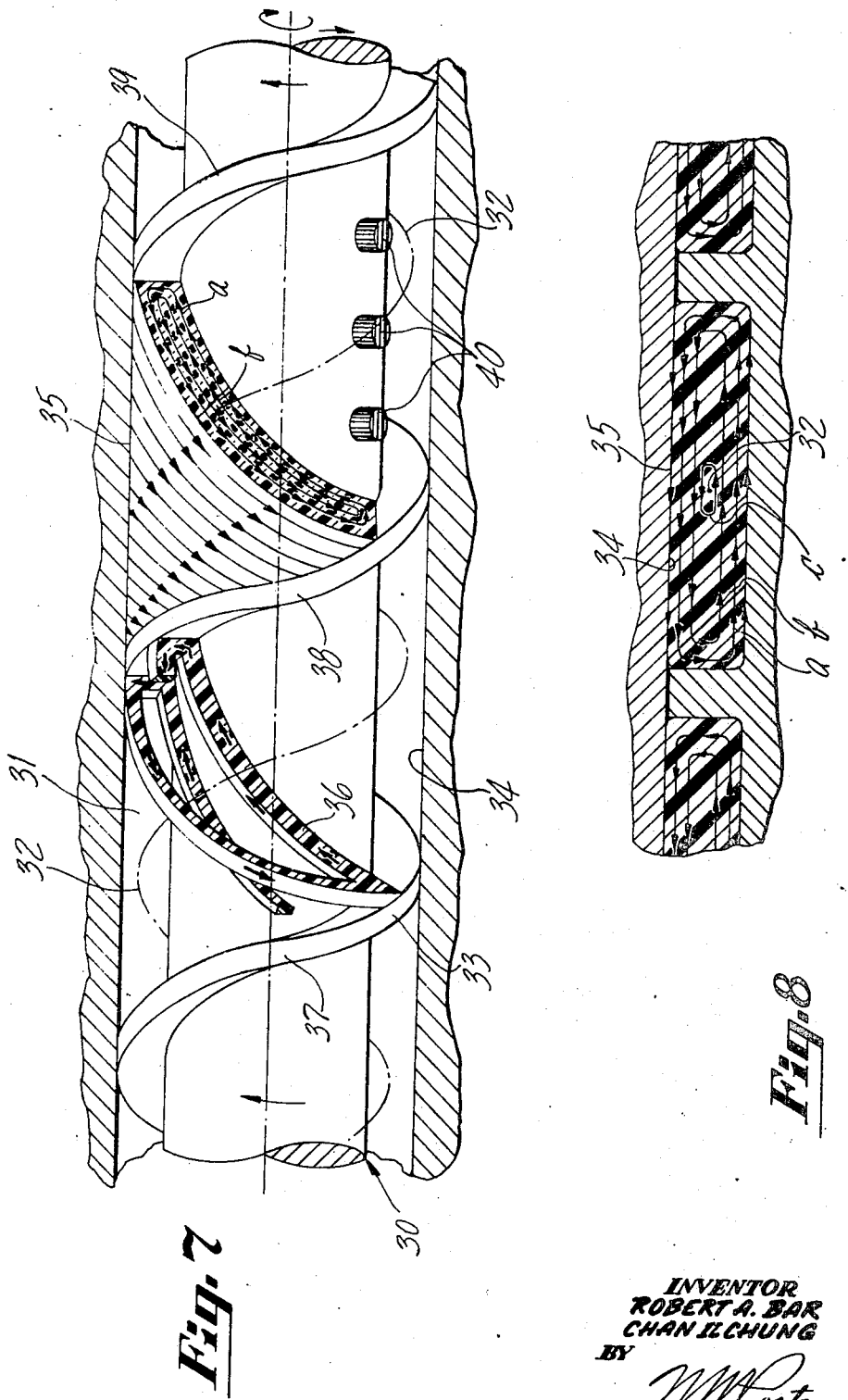

3,487,503
AUGER-TYPE EXTRUDER
Robert A. Barr, Bound Brook, and Chan Il Chung, Piscataway, N.J., assignors to Midland-Ross Corporation, Cleveland, Ohio, a corporation of Ohio
Filed June 28, 1967, Ser. No. 649,733
Int. Cl. B29f 3/02
U.S. Cl. 18—12        4 Claims

ABSTRACT OF THE DISCLOSURE

An extruder for plastic material having a specially constructed screw for discharging an extruded product at more uniform temperature achieved through impoved mixing. The screw is provided with pegs arranged crosswise of the channel between adjacent turns of one flight of the screw along a section thereof sufficiently near the discharge end of the extruder so that the material received thereby will be in a plastic condition.

---

Designers and manufacturers of auger-type extruders are under longstanding and continuing demands by users of such equipment for higher output rates. Maximum output rates of thin section products from extruders are governed in a practical way by the maximum rate at which extrusion can be performed without introducing defects in the products due to a lack of uniform temperature. For example, an extruder for spinning yarn ends is operated beyond its practical rate when the filaments passing therefrom are susceptible to breakage during processing or exhibit an unacceptable varation in denier. When the extruder product is a hot plastic of the type for producing sheet film, variations in thickness of the film are indicative of an improper rate of extrusion. Usually, the lack of temperature uniformity manifested by such defective products evinces a failure to achieve efficient mixing of the thermoplastic material within the extruder.

Better mixing and temperature distribution are possible through the use of relatively expensive extruders of increased barrel length-to-diameter ratios. The present invention is directed toward inexpensive modifications of present extruder designs employing, e.g., ordinary length-over-diameter ratios, such as in the ratio range of 15 through 25 to 1.

The essential object of this invention is to improve conventional auger-type extruders in a manner whereby greater output and/or products of improved quality may be obtained by structural differences involving minor costs.

It is particularly an object to improve the capacity of an extruder of conventional length-over-diameter (L/D) ratio to effect complete mixing of a material after reaching a plasticized state, and high thermal uniformity within the material just prior to being discharged or extruded.

It is another object to achieve greater output rates from extruders through the use of extruder screws having a deeper channel throughout their entire length, especially, in the metering section of the extruder, without increasing the barrel diameter or length.

The above objects and any others apparent from the description are achieved in an extruder wherein the screw is provided with spaced pegs which are disposed crosswise of the entire path of material flow lengthwise of a helical channel, which in its crosswise direction, is measured between adjacent turns of one flight of the extruder, and from the circumference of the screw core outwardly to the surface of revolution swept by the full height of the flight. The pegs are located in any region of the extruder in which the material is received in a molten or plastic condition. The pegs modify subsidiary currents of plastic material normally occurring in an extruder of conventional design to achieve a mode of mixing resulting in greater thermal uniformity in the material as discharged by the extruder.

In the drawing with respect to which the invention is described:

FIG. 1 is a schematic fragmentary shortened view of an extruder with parts in section;

FIG. 2 is an enlarged view of one portion of the extruder screw of the extruder of FIG. 1;

FIG. 3 is a fragmentary view in section of a portion of the extruder taken along line III—III of FIG. 1;

FIG. 4 is a diametral section of an extruder screw taken along line IV—IV of FIG. 2;

FIG. 5 is a fragmentary side view of an extruder screw portion showing a modified arrangement of pegs;

FIG. 6 is a fragmentary side elevation of a double-flight screw and a peg arrangement therefor;

FIG. 7 is a fragmentary side view of an extruder with the barrel cut away to expose the screw and portions of plastic material; and FIG. 8 is a fragmentary longitudinal cross section of the extruder of FIG. 7.

FIG. 1 illustrates an extruder screw arrangement, typical as to dimensional proportions, of conventional extruders of barrel length to internal barrel diameter (L/D) ratio in ratios such as those ranging between 15 to 1 and 25 to 1. Similarly to the typical extruder adapted for reducing a particulate, non-plastic, potentially-plastic material to condition suitable for extrusion, the extruder 5 comprises a section A in which the channel defined by a screw core 7 and a flight 8 is relatively deep, a section B generally called the "transition" section in which the core 7 increases in diameter to a point 9 and the channel becomes progressively shallower, and a section C known to the skilled as a metering section in which the channel is most shallow and the turns of flight 8 are of minimum height.

In practice, material is charged to the extruder through a throat member 11 to the section A with the object of maintaining the channels as full as possible with an unmelted particulate potentially plastic feed material. Compacting, softening, melting, and mixing takes place within section B as the material progresses through the progressively shrinking channel defined by the screw member and the interior surface of the barrel 12. Extruders are, in general, operated in such a manner as to cause the initially nonplastic material to become plastic approximately half way along section B.

Section C has the function of bringing about uniformity throughout the material transferred therethrough with respect to temperature, composition, coloring, etc. In a manner well known to the skilled mechanic, extruder performance may be improved by heating the barrel and/or the screw core 7 to increase the rate of plasticization of the material being processed. It should be easily appreciated that, once the operation of the extruder is established at a nearly a maximum rate for producing satisfactory extruded product, a slight change to a higher rate of operation may well upset the equilibrium of conditions obtained within the extruder and cause the lowering of uniformity in desired properties of the material discharged by the extruder to an intolerable level.

As thermoplastic compositions, in general, have maximum temperatures at which they will resist decomposition or other degeneration, an important consideration in the extrusion of the thermoplastic resin is to avoid a condition of over-heating within the extruder. Heat resulting from the work expended on the material processed by the extruder is sufficient in a great many instances as the exclusive source of heat for effecting plasticization.

Where the temperature between the melting point or melting range of material and the decomposition temperature is small, means for heating or cooling portions of the barrel and the screw core may need to be resorted to.

Considering now the essential feature of the invention, the extruder screw 6 comprises pegs 15 which may be arranged in a variety of patterns as herein described. In order to effectively utilize the pegs 15, they are anchored to the core 7 of the screw crosswise of the channel of one flight at least one location along the length of the screw. In the case of a single flight screw as illustrated in FIGS. 1, 2 and 5, the pegs are distributed between adjacent turns of the flight 8 spaced by different portions of the same channel. This statement holds true also for a double flight screw such as shown in FIG. 6 wherein the pegs 17 are disposed crosswise of a channel measured between successive turns 18, 19 of the flight 21 regardless of the fact that a turn 22 of a second flight, i.e., flight 23, passes between turns 18 and 19 and divides the pegs 17 into two groups.

The number of pegs, their location, diameter, and spacing may vary according to a particular application of the extruder, the melt temperature, type of plastic shape extruded, type of material fed to the extruder, and other variables. For some applications, a single group of pegs 15 attached to a single area of the core 7 as shown in FIG. 2 will suffice. Passage of a plasticized material through a group of such pegs brings about substantial mixing and in conjunction with other design features of the extruder results in satisfactory heating of the material. Where the nature of the material permits or requires vigorous heating and mixing, additional groups of pegs may be provided at a plurality of locations lengthwise of the extruder within that portion of its length wherein plasticization is achieved.

FIG. 1 illustrates three groups of pegs spaced crosswise of the entire width of the channel at three separated portions of the channel. In this embodiment, the pegs are all of the same approximate size but differ in spacing and number as between groups. Group M, located in the transitional section B of the extruder, comprises three pegs (one of which is not shown). Of the three groups, group M will contribute an initial, least vigorous, disintegrating effect on the normal currents of the plasticized material occurring within the channel of the screw. It should be noted that the pegs of group M are aligned parallel to the axis of the screw rather than directly transversally of the spiral channel defined by the flight 8. As found in group M, pegs of one-quarter inch in diameter may be spaced at five-eighths inch from the nearest peg or the adjacent flight portion.

The pegs of the second group N are arranged in two rows at slightly less spacing, e.g., one-half inch apart, than those of group M. Consequently, the material passing lengthwise of the extruder is now subjected to a greater change of velocity, hence, greater instantaneous shear forces, greater mixing, and increased temperature elevation as it passes through the smaller openings between the pegs. Again in group N, the pegs are arranged in rows extending parallel with the axis of the screw.

In an area of the channel closer to the discharge end, a third group P of the fifteen pegs are arranged in three rows at still less spacing than group N. For example, pegs of one-quarter inch diameter and spaced three-eighths inch from each other in the same row and from pegs of adjacent rows in group P have given satisfactory results acting as a single group or in combination with other groups as now described. The pegs of group P give to the plasticized material its most vigorous mixing. In many instances, a group of pegs, such as group P, is sufficient to accomplish such intimate mixing as to obtain good color distribution and thermal uniformity without the aid of preliminary mixing groups such as groups N and M. When cooling of the barrel and/or the screw is not resulted to, it will be desirable in some instances to avoid the use of more than one or two groups of pegs to control temperature elevation under destructive or decomposition levels if satisfactory extruded product can be obtained. In an arrangement contrary to groups M and N, the rows of group P extend in nonparallel relation with the axis of the screw and in approximately perpendicular relation with the helical direction of the channel defined by the adjacent turns of the flight 8. In another manner of speaking, the rows of group P follow the shortest direction between flight portions defining the adjacent turns of the flight.

FIG. 5 illustrates still another pattern for arranging a group of pegs 25. In this arrangement, the rows extend, as found in group P of FIG. 1, perpendicular to the direction of the channel rather than parallel with the extruder axis. The pegs of each row are in staggered relation with those of the adjacent row.

FIGS. 3 and 4 demonstrate clearly that the pegs are of approximately the same height as the flight in all cases. They are installed as a part of the extruder screw by drilling holes along radial axes in the core 7 at preferably greater depths than the height of the pin above the core. The holes are drilled to a diameter requiring press fitting of the pegs. The pegs may be positively anchored in the core by, previously to their insertion, placing silver solder powder and flux in the bottom of the hole, thereafter pressing the peg thereinto, and heating the peg and adjacent core area until bonding has taken place. As the pegs are ordinarily made over-sized in regard to length, their outer end surfaces are ground, machined or otherwise trimmed to a contour conforming with the surface of revolution swept by the flight 8 as shown in FIG. 2.

For a better understanding of the invention, FIG. 7 illustrates schematically the manner in which subsidiary currents of a melted thermoplastic material mentioned earlier herein are established within a conventional extruder in a direction crosswise of the channel of the screw. The general direction of the melted material relative to the screw 30 is lengthwise of the helical channel 21 in which it is received. For purposes of description, the channel may be regarded as having a helical axis 32 extending lengthwise of the channel midway between adjacent turns of the flight 33.

In addition to general movement along the channel lengthwise of the axis 32, the thermoplastic material, on attaining fluidity, flows transversely and circularly around the axis 32. Hence, if the body of material contained by the extruder is viewed for purposes of description as in assemblage of minute elements, each element traverses a path which is a helix having its convolutions centered about an axis 31 which is also a helix. This rather complex movement of material within a conventional extruder is generated by the frictional contact of the inner barrel surface 34 with radially outer surface 35 of the variably plastic material. Because of heat transmission at the interface of the material with the barrel or screw surfaces resulting from frictional heating, or by heating or cooling of equipment, a temperature gradient normally exists which varies outwardly from the axis 31 to such interface.

In FIGS. 7 and 8, lines *a, b,* and *c* are drawn on the face of a cross section of the plastic melt undergoing transfer through the extruder to illustrate an approximate flow pattern about the channel between turns 37 and 38 to illustrate the helical nature of the path such as might be traversed by a particle of the melt following flow line *a*. Considering now the portion of the melt progressing toward the right contained between turns 38 and 39, it is obvious that this portion of the melt is about to pass between the pegs 40. These pegs, as taught above, have a height approximately the full height of the flight and thus penetrate the full height of the material contained in the channel to disrupt the normal cross channel currents of the material and cause mixing of the material previously circulating closely to the material flow axis 32, e.g., along line *a*, with material circulating further away from axis 32 e.g., along lines *b* and *c* and vice versa.

It may be noted in FIG. 7 that the cross current direction of the melted material is disposed at a different angle relative than that of the line along which the pegs 40 are disposed. Further study is expected to confirm that this is an advantageous arrangement.

In past practice, achievement of acceptably uniform temperatures in extruder product has been obtained principally through a reduction of the channel depth within the metering section at the expense of the delivery capacity of the extruder.

The present invention is highly advantageous in avoiding reduction of channel cross section in the metering section of an extruder that would be otherwise necessary to achieve suitable plasticity of the material. The provision of extruder screws provided with pegs within the final section enable the use of deeper channels than otherwise possible and, hence, extruders of greater capacity than have been previously possible in handling of many thermally sensitive synthetic resins. Rather than thinning out the flow path of the melt stream to a low-capacity flat stream, the function attained in the present invention is to divide the melt stream into a number of smaller streams, thereby exposing molten resin to high shear rates for a very short time after which they merge again in mixed condition. For the advantage gained, the added cost of manufacturing of extruder screws in accordance with the invention is very low. Another obvious and important advantage inherent from the nature of the invention is the reconstruction of original equipment screws from, or providing such extruders with, newly manufactured screws equipped with pegs for continued use of an extruder.

What is claimed is:

1. A screw for an extruder adapted to receive and transform a particulate potentially plastic material to an approximately homogeneous plastic condition comprising:
   a core and a helical flight extending outwardly from the core to a surface of revolution concentric with the longitudinal axis of the core, said flight defining a channel measured in its transverse direction between adjacent turns of said flight, and extending in its longitudinal direction in a helical path lengthwise of the screw;
   said screw having a rear section and a second section in frontward relation to the rear section along which said material is in a plastic condition in the operation of said extruder; and
   a plurality of pegs extending outwardly from said core to said surface of revolution in a pattern wherein the pegs are arranged crosswise of said channel at at least one site along said second screw section.

2. An auger-type extruder for plastic materials comprising:
   a barrel having a bore therethrough defining a rear feed end and a front discharge end;
   a screw supported within the barrel having a core and a helical flight extending outwardly from the core to a surface of revolution in concentric relation with the longitudinal axis of the core and close concentric relation with the inner surface of the barrel;
   said screw having a rear section adapted for compacting and plasticizing a potentially plastic feed material and a second section in frontward relation with the rear section adapted to mix and effect temperature uniformity in said material in plastic condition;
   said flight defining a channel measured in its transverse direction between adjacent turns of said flight, and extending in its longitudinal direction in a helical path lengthwise of the screw; and
   a plurality of pegs extending outwardly from said core to said surface of revolution in a pattern wherein the pegs are arranged crosswise of said channel at at least one site along the length of said second section in spaced relation with each other and adjacent flight turns.

3. The extruder of claim 2 wherein the outer end surfaces of the pegs conform to said surface of revolution.

4. The extruder of claim 2 wherein;
   said pegs are equally spaced with respect to adjacent pegs and adjacent flight portions.

References Cited

UNITED STATES PATENTS

| | | |
|---|---|---|
| 2,518,124 | 8/1950 | Corbett. |
| 2,838,794 | 6/1958 | Munger et al. |

WILLIAM J. STEPHENSON, Primary Examiner